Sept. 9, 1958 V. TRUE ET AL 2,851,662

TRANSMISSION LINE PHASE DEVIATION DETECTOR

Original Filed June 28, 1951 2 Sheets-Sheet 1

INVENTORS
VIRGIL TRUE
BERT FISK

BY W. R. Mattox
Richard C. Reed

ATTORNEYS

TRANSMISSION LINE PHASE DEVIATION DETECTOR

Original Filed June 28, 1951 2 Sheets-Sheet 2

INVENTORS
VIRGIL TRUE
BERT FISK

BY W. R. Mattox
Richard E. Reed
ATTORNEYS

United States Patent Office 2,851,662
Patented Sept. 9, 1958

2,851,662

TRANSMISSION LINE PHASE DEVIATION DETECTOR

Virgil True, Oxnard, Calif., and Bert Fisk, Washington, D. C.

Original application June 28, 1951, Serial No. 234,135. Divided and this application November 29, 1955, Serial No. 549,897

3 Claims. (Cl. 324—83)

(Granted under Title 35, U. S. Code (1952), sec. 266)

The invention described herein may be manufactured and used by or for the Government of the United States of America for governmental purposes without the payment of any royalties thereon or therefor.

This application is a division of our copending application No. 234,135, filed June 28, 1951, now U. S. Patent No. 2,745,067 which issued May 8, 1956.

This invention relates to a system for automatically matching impedance magnitude and phase angle with that of a known impedance and has been designed especially for communication transmitters for matching an antenna to a transmission line. In such installations, a matching device is required at the base of the antenna so that the input impedance to the antenna may be matched to the characteristic impedance of the transmission line.

This invention is not limited to use with either transmitters or antennas. This system may be adapted for use in any A. C. circuit. For example, commercial power lines may have their power factors automatically controlled by an embodiment of this invention. Another adaptation of this device is to control the impedance of a dielectric heating device such as disclosed by R. H. Hagopian in the December 1950 issue of "Electronics" on page 98.

Present impedance matching devices are manually operated and may be remotely adjusted only to a fixed number of preset positions. Moreover, it is a complex and time consuming operation to preset these positions. Once set, no allowance is made for changes in input impedance to the antenna due to changing conditions, such as those encountered on a moving ship, where the antenna may be constantly changing its relative positive and angle of mounting with respect to the ground plane. In view of the obvious disadvantages it is apparent that a quick acting, fully automatic matching system is desirable.

Accordingly it is an object of this invention to have a matching system perform an entire matching operation automatically and in a minimum time.

It is another object of this invention to present a fully automatic matching system, thereby reducing the complexity of the work performed by operators.

It is still another object of this invention to supply a matching system that operates at all times the transmitter is on and is continuously and automatically variable so that compensation will be made for load or transmission line under operating conditions.

A further object of this invention is to provide a device to detect the phase angle between voltage and current in an electrical circuit by means of an impressed voltage which is a function of this phase angle.

Figures 1, 2, 3, 4:
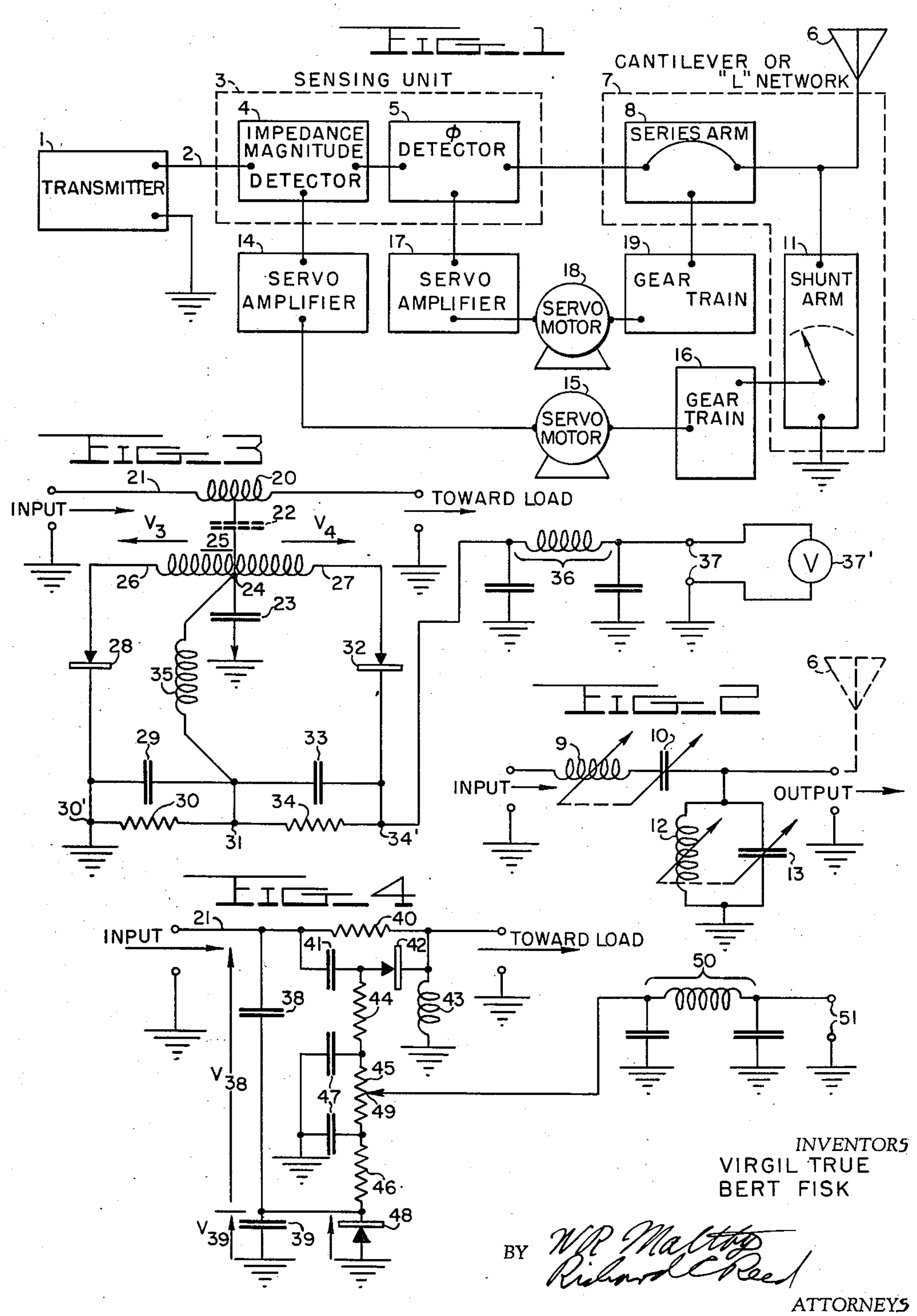
Figure 5:
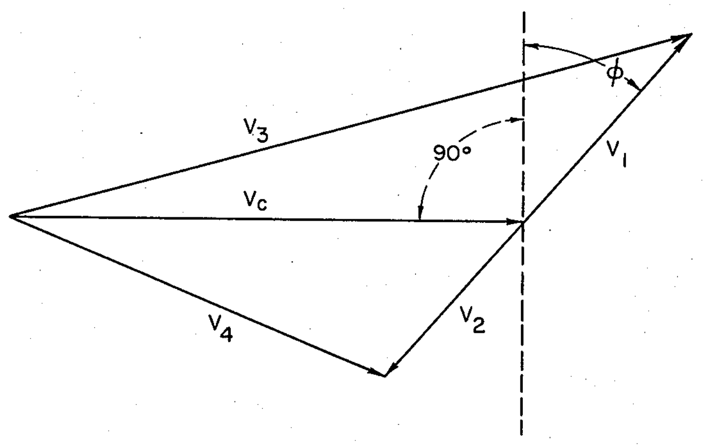
Figure 6:
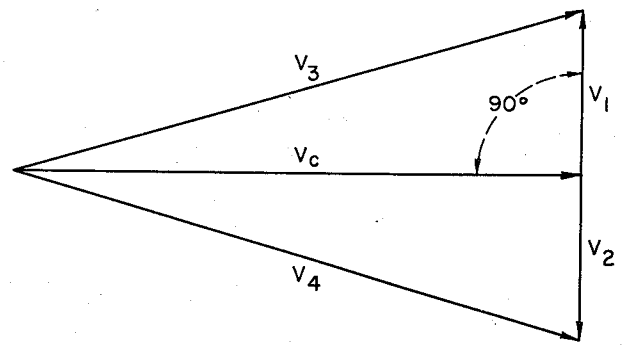

Other objects and features of the invention will be apparent from the following disclosure and the appended drawings; wherein, Fig. 1 is a block diagram of the automatic impedance-matching system of the present invention, Fig. 2 is a schematic diagram of one type of matching network useful in matching the variable impedance of an antenna to a line, Fig. 3 is a schematic diagram of the phase angle detector 5 which is shown in block diagram in Fig. 1, Fig. 4 is a schematic diagram of the impedance-magnitude detector 4 shown in block diagram in Fig. 1, Fig. 5 is a vector diagram of the voltages in the phase angle detector system when the variable load contains reactance elements, and Fig. 6 is a vector diagram of the voltages in the phase angle detector system when the variable load is a pure resistance.

For purposes of illustration, the teachings of the present invention as shown in Fig. 1, are employed to match the impedance of a suitable antenna 6 to a transmission line 2. The latter is shown connected to and excited by a communication transmitter 1. The impedance matching of antenna 6 to line 2 is obtained by connection of the former to the latter through an impedance matching network 7 connected between the load 6 and the line 2. In this example, where the load 6 is an antenna or other device which exhibits both capacitive and inductive reactance qualities with frequency variation, a specialized impedance network 7 is preferred. In particular, this network is a cantilever, or L-type circuit, which, as later described in detail, comprises an adjustable reactive series arm 8 and an adjustable reactive shunt arm 11. The shunt arm 11 is adjusted to transform the input impedance of the antenna to an impedance whose resistive component is equal to the characteristic resistance of the transmission line 2, and the series arm 8 is adjusted to eliminate the reactive component from the parallel impedance of the antenna and the shunt arm 11.

In power applications, such as exemplified herein, where a transmitter is used to excite a load such as antenna 6, the series and shunt arms 8 and 11 of network 7 are preferably made mechanically adjustable, with the adjustments made by a pair of servo motors 15 and 18 which are connected to the variable components of the network 7 through a pair of suitable gear trains 16 and 19.

To render the system automatic, a sensing unit 3 which comprises an impedance magnitude detector 4 and a phase angle detector 5 is connected in the line 2 between the impedance matching network 7 and the transmitter 1. The impedance detector 4 is a circuit which generates an error voltage when the resistance component of the input impedance to network 7 differs from the characteristic impedance of the line. This voltage has a sign and a magnitude which is dependent on the sense and degree of difference in the two aforementioned impedances and is zero when zero difference in impedances exist.

The phase detector 5, which will be described in detail, is a circuit which generates an error voltage which is proportional to the phase angle between the line current and line voltage. This voltage like that derived by the impedance detector has a sign and a magnitude dependent on the sense and degree of phase angle between line voltage and current.

Again, in power applications of the type illustrated, the error voltages generated by the detectors 4 and 6 are fed through suitable servo amplifiers 14 and 17 to the servo motors 15 and 18 which adjust the series and shunt arms 8 and 11 of the impedance matching network 7 to minimize the error voltages and thereby constantly maintain the desired impedance match.

In power applications such as herein described, a mechanically adjustable impedance network 7 of the above type is preferred. In non-power applications, however, it may be desirable to employ reactance tubes or the like in the impedance matching network. In this case the error voltages could be used directly to perform the adjustments necessary to obtain an impedance match.

In devising this system to match a 35 foot whip antenna 6 to a 50 ohm line 2 over a frequency range of 2 to 26 megacycles it was revealed that neither of the two common types of cantilever circuits (series L and shunt C, or series C and shunt L) would suffice because, in order to obtain matching, the sign of the reactance of each of the two arms of the cantilever network must change over the broad band of frequencies utilized. Accordingly and for the purpose of matching the above identified antenna to a 50 ohm line, a compound cantilever network 7 shown in block diagram in Fig 1 and schematically in Fig. 2 was devised. This network comprises a series arm 8 comprising a rigidly coupled variable inductance 9 and capacitance 10 electrically connected in series, and a shunt arm 11 comprising a rigidly coupled variable inductance 12 and capacitance 13 electrically connected in parallel. In operation variable inductance 12 and capacitance 13 are mechanically coupled and driven by servo motor 15 so that when inductance 12 reaches minimum inductance, capacitance 13 reaches minimum capacitance and when inductance 12 reaches maximum inductance, capacitance 13 reaches maximum capacitance. Similarly variable inductance 9 and capacitor 10 are coupled together and driven by servo motor 18 so that when inductance 9 reaches a minimum, capacitance 10 also reaches a minimum and when inductance 9 reaches a maximum, capacitance 10 also reaches a maximum.

Attention is now directed to the phase angle detector of Fig. 3, which has been designed to produce an error voltage when the line voltage and line current are out of phase. This error voltage causes the series arm 8 to be driven until the phase difference is eliminated from the line. In this figure, 20 represents an inductance which is shown as a coil, but which may be simply a portion of one conductor 21 of the transmission line at ultra-high frequencies. Condensers 22 and 23 operate as a voltage divider leading from a center tap on inductance 20 to center tap 24 on inductance 25 dividing the latter into two equal branches 26 and 27. Inductance 25 is preferably a U-shaped wire or copper tubing at high and ultrahigh-frequencies. It has been found that the distributive capacitance between inductances 20 and 25 will suffice for condenser 22 at such ultrahigh-frequencies. Branch 26 leads to rectifier crystal 28 and resistor 30 to a common coupling 31. Condenser 29 is connected in parallel with resistor 30. Branch 27 leads to rectifier crystal 32 and resistor 34 to common coupling 31. Condenser 33 is connected in parallel with resistor 34. A suitable radio frequency impedance 35 couples center tap 24 to common coupling 31. A conventional $\pi$ section A. C. filter 36 couples the resistors 30 and 34 to output terminals 37 across which a voltmeter 37' is shown connected to indicate voltage deviations across the resistors 30 and 34.

There are two components of voltage in branches 26 and 27 of the phase angle detector circuit. These voltage components are (1) the voltage directly received from the line 21 and built upon condenser 23 at center tap 24, and (2) the voltage induced from the current in the line 21. The former voltage is in phase with the line voltage whereas the induced voltage is 90° out of phase with the line current. The induced voltage in branches 26 and 27 are equal in magnitude, but if the load contains reactance elements, then the phase relation of the induced voltage is other than 90° with respect to the voltage directly received. Referring to Figs. 5 and 6, $V_c$ is the voltage across condenser 23, $V_1$ is the voltage induced in branch 26 by the electromagnetic field produced by the line current and $V_2$ is the voltage induced in branch 27 by the same field. $V_3$ and $V_4$ represent the vector sums of the induced voltage plus the voltage impressed on condenser 23 in the respective branches. Branch 26 is coupled to a crystal rectifier 28 to permit positive pulses of $V_3$ to be passed through resistor 30 to coupling 31. Condenser 29 acts as a storage device and tends to smooth the pulses of energy passing through resistor 30. Branch 27 is a mirror image of the circuit of branch 26 and is coupled to crystal rectifier 32 to allow positive pulses of $V_4$ to be passed through rectifier 32 and resistor 34 and to oppose the pulse through resistor 30. Condenser 33 acts in a manner similar to condenser 29. Any A. C. in this circuit is filtered out by means of filter 36. It will be seen that any potential difference between points 30' and 34' will be impressed across terminals 37 of Fig. 3. In the depicted embodiment, any potential difference between points 30' and 34' indicates that $V_3$ and $V_4$ are unequal due to reactance in the load. This potential difference is magnified by amplifier 17 and used to drive servo motor 18 which operates a gear train which in turn, causes the series arm 8 of the cantilever network 7 to operate. This causes a rotation of mechanically coupled inductor 9 and capacitor 10 which are electrically in series. Both components of series arm 8 can be varied continuously. Motor 18 continues to operate the gear train 19 until until there is no potential to drive it. Then, the load has no reactive component. Should there be no reactive component in the load originally, no voltage is present to drive the motor 18, since the magnitude of $V_3$ and $V_4$ are equal as seen in Fig. 6. The phase angle between line voltage and line current is zero under these circumstances.

Three features of the phase angle deviation detector which are particularly advantageous in the exemplary antenna matching arrangement are (1) the unit output is zero when the phase angle between the line voltage and line current is zero, (2) the unit output changes in direction with a change in sign of the phase angle, and (3) the rate of change of output of the unit with respect to phase angle is greatest in the vicinity of zero phase angle so that the sharpest tuning effect is obtainable when the current and voltage of the line are approximately in phase.

Fig. 4 shows a schematic diagram of the impedance-magnitude detector designed to produce an error voltage when the total impedance of the antenna 6 and cantilever network 7 differs from the fixed line impedance. This error voltage causes shunt arm 11 to be driven until the impedances are matched.

In order to speed up the action of the system, servo motor 18 is made to operate four times as rapidly as servo motor 15. This enables the phase to be brought into equilibrium rapidly and there is no necessity for the impedance magnitude system to have to compensate continually while there remains a diminishing reactance component in the load impedance. By this arrangement, any reactance in the load impedance is quickly eliminated and the impedance magnitude detector operates to match a pure resistance, rather than an impedance containing a variable reactance component.

When the relative positions of the impedance magnitude detector and phase detector within the sensing unit may be reversed from the arrangement shown in the drawing, it has been found preferable to have the phase detector placed close to the antenna.

A device which automatically compensates for changes in load impedance due to both a change of phase between voltage and current and also a change in impedance magnitude has been provided. The device includes a detecting means to measure phase angle deviation and also a detection means to measure impedance magnitude deviation. Measurements of deviation may be made by placing properly calibrated D. C. voltmeters across terminals 37 and across terminals 51. It is understood, of course, that it is within the purview of this invention to connect any type of voltage sensitive means across these terminals to indicate a voltage deviation.

Finally, it is understood that this invention is to be limited only by the scope of the claims appended hereto.

What is claimed is:

1. A transmission line phase deviation detector for indicating a deviation in phase angle between line current and line voltage comprising a first inductive means adapted to be disposed in juxtaposition with a transmission line such that the inductive field resulting from the passage of line current through said transmission line traverses said first inductive means, first capacitive means coupling said transmission line to the midpoint of said first inductive means, second capacitive means serially connected with said first capacitive means across said transmission line forming a voltage division network there-across, said second capacitive means having a substantially greater capacity then said first capacitive means, first and second serially connected load impedances, line frequency isolation means connecting the junction of said first and second load impedances with said midpoint of said first inductive means, first and second unidirectional elements connecting the halves of said first inductive means across their respective load impedances such that pulses of opposite polarity will flow through said first and second load impedances, said first unidirectional means being connected in shunt with said second capacitive means via the respective half of said first inductive means and voltage sensitive means connected across said serially connected load impedance for indicating a deviation in voltage magnitude.

2. A transmission line phase deviation detector for indicating a deviation in phase angle between line current and line voltage comprising a first inductive means adapted to be disposed in juxtaposition with a transmission line such that the inductive field resulting from the passage of line current through said transmission line traverses said first inductive means, first capacitive means coupling said transmission line to the midpoint of said first inductive means, second capacitive means serially connected with said first capacitive means across said transmission line forming a voltage division network thereacross, said second capacitive means having a substantially greater capacity than said first capacitive means, first and second serially connected load impedances, second inductive means for preventing the passage of high frequency energy connecting the junction of said first and second load impedances with said midpoint of said first inductive means, first and second unidirectional elements connecting the halves of said first inductive means across their respective load impedances such that pulses of opposite polarity will flow through said first and second load impedances, said first unidirectional means being connected in shunt with said second capacitive means via the respective half of said first inductive means and voltage sensitive means connected across said serially connected load impedances for indicating a deviation in voltage magnitude.

3. A transmission line phase deviation detector for indicating a deviation in phase angle between line current and line voltage comprising a first inductive means adapted to be disposed in juxtaposition with a transmission line such that the inductive field resulting from the passage of line current through said transmission line traverses said first inductive means, said first inductive means being adapted to be disposed with respect to said transmission line such that a significant distributive capacity coupling exists between said transmission line and the midpoint of said first inductive means, second capacitive means serially connected with said distributive capacity across said transmission line forming a voltage division network thereacross, said second capacitive means having a substantially greater capacity than said distributive capacity, first and second serially connected load impedances, line frequency isolation means connecting the junction of said first and second load impedances with said midpoint of said first inductive means, first and second unidirectional elements connecting the halves of said first inductive means across their respective load impedances such that pulses of opposite polarity will flow through said first and second load impedances, said first unidirectional means being connected in shunt with said second capacitive means via the respective half of said first inductive means and voltage sensitive means connected across said serially connected load impedances for indicating a deviation in voltage magnitude.

References Cited in the file of this patent

UNITED STATES PATENTS

| | | |
|---|---|---|
| 2,313,699 | Roberts | Mar. 9, 1943 |
| 2,585,001 | Frommer | Feb. 12, 1952 |
| 2,691,132 | Sherwood et al. | Oct. 5, 1954 |
| 2,734,168 | Zachary et al. | Feb. 7, 1956 |
| 2,797,387 | Adams et al. | June 25, 1957 |